N. W. CLARK.
Pisciculture.

No. 149,198.          Patented March 31, 1874.

UNITED STATES PATENT OFFICE.

NELSON W. CLARK, OF CLARKSTON, MICHIGAN.

IMPROVEMENT IN PISCICULTURE.

Specification forming part of Letters Patent No. 149,198, dated March 31, 1874; application filed February 6, 1874.

*To all whom it may concern:*

Be it known that I, NELSON W. CLARK, of Clarkston, in the county of Oakland and State of Michigan, have invented an Improvement in Process for Preserving and Maturing Fish-Eggs Preparatory to Hatching, of which the following is a specification:

The nature of this invention relates to an improvement in a means and process for preserving and maturing fish-eggs preparatory to hatching them. The object of my invention is to so preserve the eggs during the maturing season as to greatly lessen the labor of caring for them, and picking out the imperfect and dead eggs; also, to prolong the maturing period until the natural hatching-season, a feature of great importance in breeding varieties of fish which hatch in the spring—such as the white fish and others of the salmonoid family— the breeding of which has hitherto been unsuccessful, or partially so, for the reason that the young fish artificially bred in the usual way in spring-water were hatched out before the natural time, and before their natural food and sustenance were ready for them.

In the usual way of maturing and hatching fish-eggs in trays or boxes, and immersed in a stream of running water, great numbers of the eggs die. Becoming putrescent, they contaminate and destroy others adjacent, unless great care be taken to remove them at the daily inspection and picking over, which is not only laborious but expensive. By my process the eggs are not matured in water, but are kept upon screens of any suitable fabric, between layers of moss, sponge, or other moisture absorbing and retaining material, and kept at a temperature slightly above the freezing-point until a short time prior to the natural hatching-season, when the eggs are placed in water to hatch out. The dead and imperfectly impregnated eggs, instead of putrefying and contaminating others, as is the case where the eggs mature in water, merely waste away without doing any injury to the living ova.

The mechanical means employed in carrying out my process may be either stationary or portable in character, the latter of which I will now proceed to describe.

Figure 1:
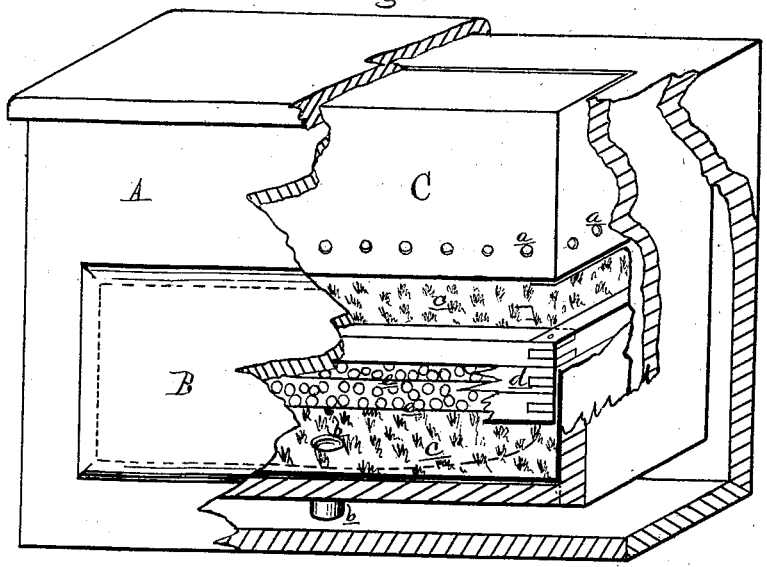
Figure 2:
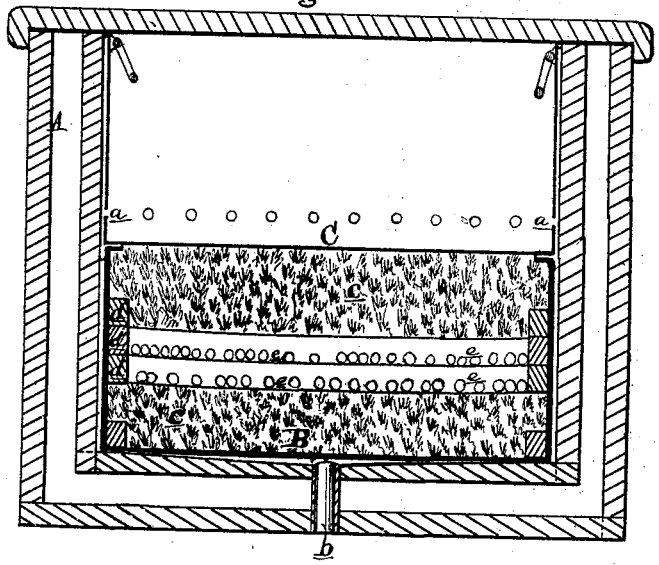

Figure 1 is a perspective view of a portable maturing and egg-transporting box with portions broken out. Fig. 2 is a cross-section of the same.

In the drawing, A represents an ice-box, which should be double-walled and provided with a drawer, B, at the lower part, above which is a partition, C, shaped like a movable pan, to contain ice. In the side walls of this pan, at a little distance above the bottom, perforations *a* are made, which permit the water resulting from the melting of the ice to flow out, falling to the bottom of the box, passing outside the drawer, passing out of the box through a drip-hole, *b*, in the bottom, its upper end being protected with a screen. In the bottom of the drawer I place a layer of moss, sponge, or other material which will absorb and retain moisture, represented at *c*, above which I place any convenient number of screen-frames *d*, covered with flannel *e* or any other suitable fabric, upon which the impregnated eggs are laid. The frames may, however, be dispensed with, and the fabric laid loosely in place. The uppermost fabric has no eggs laid on it, but is overlaid with a layer of moss or sponge. The entire mass is saturated with water, and afterward moistened as occasion may require, if sufficient moisture be not absorbed from the water resulting from the melting of the ice in the pan above. A stationary structure may be fitted up in substantially the same manner. In all cases, however, care must be taken to keep the temperature of the egg-receptacle low, but not low enough to freeze, as in that case the eggs must be killed.

As hereinbefore stated, the breeding of the white fish and other members of the salmonoid family found in the northern lakes has not been successful, especially so in the case of the highly-prized white fish. The attempts made by experienced pisciculturists embraced the various hatching troughs and boxes, with running streams of spring-water, so successfully used in breeding other varieties of fish. Spring-water has been deemed essential for this purpose on account of its unvarying temperature, which is a mean of 48° Fahrenheit.

In investigating the habits of the white fish I found that they spawned in the fore part of November, and that the eggs were hatched out about the first days of April, the mean temperature of the water being about 33°. I was forced, then, to the conclusion, that in hatching these eggs artificially in spring-water of a higher temperature, the hatching being accomplished about the middle of January to the first of February, the young fish could not find at that period the food in the water necessary to their sustenance, and therefore the hatching must be retarded until about the natural time, when their food would be ready for them; hence I keep the temperature of the egg-receptacle nearly down to the freezing-point until a day or two prior to the hatching-period, when the eggs may be placed in the water to hatch out in hatching boxes or troughs of the usual construction, or in floating boxes with screens at the ends and bottom of the said boxes, placed in the waters to be stocked.

It is evident that the maturing process may be carried on in the portable boxes while in transit, even if many weeks' time be consumed in the transit, provided the eggs be kept moist and subjected to as low a temperature as their nature requires.

In this connection, the eggs of the shad and other summer-spawning fish, which hatch out in from twenty-four to eighty hours in warm water, may be retarded in hatching out, so that the eggs may be transported to the waters to be stocked, instead of the young fish, which require a great volume of water for the transportation of a comparatively small number, the mortality being very great under favorable circumstances, and with the utmost care taken to insure safe transit.

What I claim as my invention, and desire to secure by Letters Patent, is—

The process herein described for preserving and maturing fish-eggs by placing them in a receptacle where they are kept moist and subjected to a temperature slightly above the freezing-point, substantially in the manner and for the purpose set forth.

N. W. CLARK.

Witnesses:
   H. F. EBERTS,
   H. G. SPRAGUE.